UNITED STATES PATENT OFFICE.

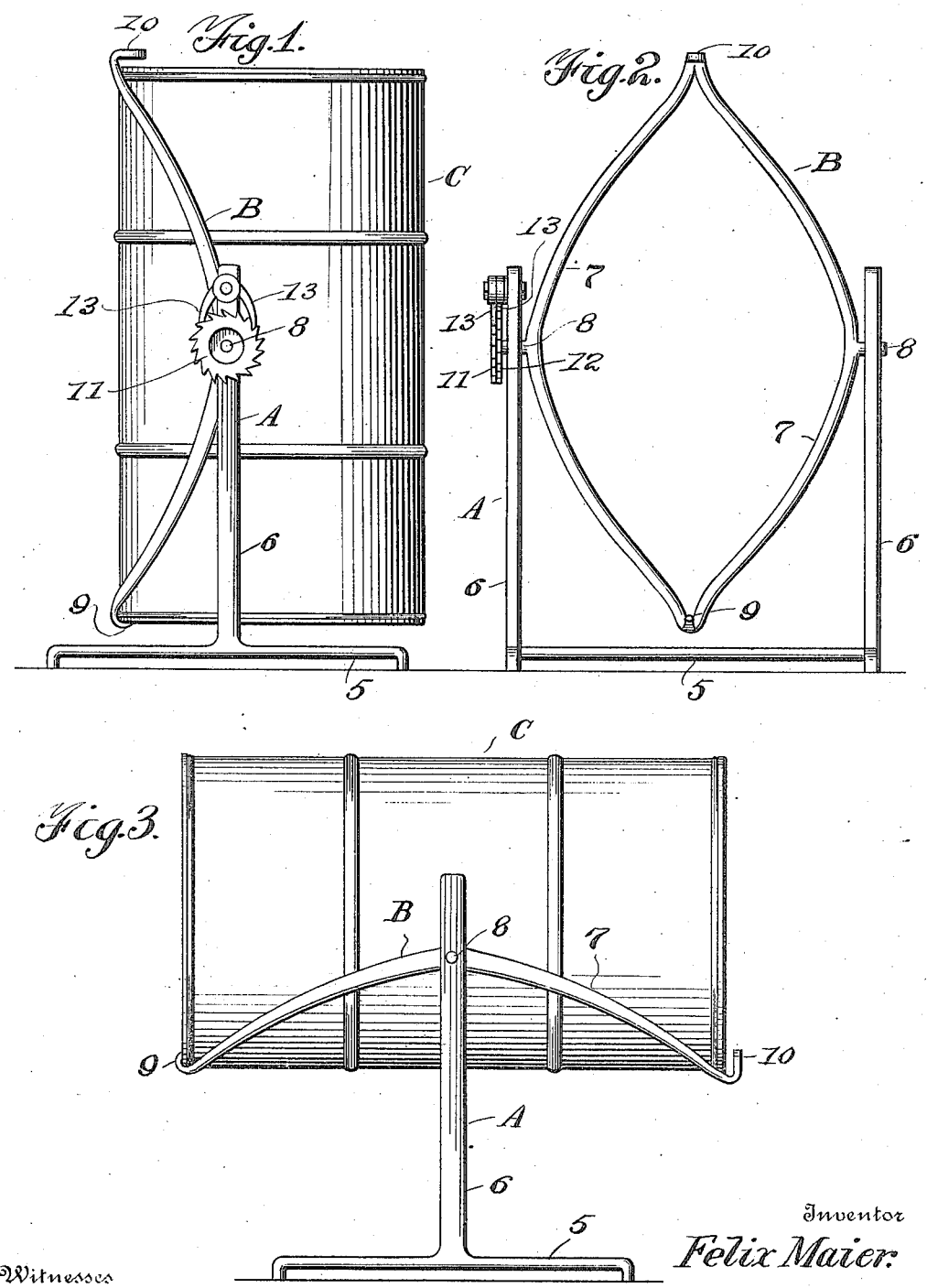
F. MAIER.
BARREL STAND.
APPLICATION FILED FEB. 12, 1916.
1,233,091.
Patented July 10, 1917.

FELIX MAIER, OF FREDERICKSBURG, TEXAS.

BARREL-STAND.

1,233,091. Specification of Letters Patent. Patented July 10, 1917.

Application filed February 12, 1916. Serial No. 77,915.

*To all whom it may concern:*

Be it known that I, FELIX MAIER, a citizen of the United States, residing at Fredericksburg, in the county of Gillespie and State of Texas, have invented new and useful Improvements in Barrel-Stands, of which the following is a specification.

This invention contemplates the provision of a device primarily designed to support a barrel or other like dispensing receptacle, in a manner to permit the receptacle being easily tilted to different angular discharge positions, together with means for holding the receptacle fixed in any of its adjusted positions.

The nature and advantages of the invention will be better understood from the following description when taken in connection with the accompanying drawing, the invention residing in the novel construction, combination and arrangement of parts as claimed.

In the drawing forming part of this specification, like numerals of reference indicate similar parts throughout the several views, and wherein:

Figure 1 is a side elevation of the device showing the receptacle in normal position thereon.

Fig. 2 is a front elevation of the device with the receptacle removed.

Fig. 3 is a side elevation showing the receptacle and its support in one of its adjusted positions.

Before entering into a detail description of what is herein shown, and considered the preferred embodiment of the invention, I desire to have it understood that I do not limit myself to the precise construction and arrangement of parts illustrated, and that such changes may be made when desired as fall within the scope of what is claimed.

Referring more particularly to the drawing the device consists of a stand A upon which is pivotally mounted the rack B, which latter is adapted to support the receptacle C. The stand preferably consists of a base 5 constructed from any suitable material, and from which rises the spaced parallel standards 6. It is between these standards that the rack B is pivotally mounted, and it might be stated that the rack may be of any appropriate form and design to accommodate itself to the particular receptacle which it is adapted to support.

However as shown in this particular instance the rack possesses a substantially diamond shaped outline, the opposite sides 7 of which are bowed or curved in the proper direction so as to be disposed at and embrace the opposite sides of the receptacle in the manner clearly shown in Figs. 1 and 3. Projecting centrally from the opposite sides 7 of the rack are laterally disposed pivot studs 8 journaled in suitable apertures formed in the standards 6, and by reason of which arrangement the rack obviously is mounted for tilting movement. One end or apex of the rack terminates to provide a hook 9 adapted to engage against the bottom of the receptacle and coöperate with the opposite sides 7 of the rack to support the receptacle thereon in the manner shown in Fig. 1, while the directly opposed end or apex of the rack terminates to provide a lateral offset or flange 10 which serves to prevent the receptacle from falling off the rack when the latter together with the barrel is adjusted to its maximum degree of inclination or approximately thereto.

With a view of automatically locking and holding both the rack and receptacle in any of its adjusted positions, I preferably make use of a pair of ratchet wheels 11 and 12 respectively, both of which are fixed upon one of the pivot studs 8 for rotation therewith and disposed exteriorly of the adjacent standard 6. Suitably secured to said standard at a point above the said ratchet wheels, are resilient pawls 13, one for each of the said ratchet wheels, the pawls coöperating with the teeth of said wheels to automatically lock and hold the rack in adjusted position irrespective of the direction in which the rack is tilted. It is of course to be understood that the teeth on the ratchet wheel 11 are reversely disposed with respect to the teeth on the wheel 12, and when it is desired to move the rack and receptacle to normal position such as shown in Fig. 1, it is necessary to disengage one or the other of the pawls 13 from its corresponding ratchet wheel.

Manifestly I have provided a device wherein a dispensing receptacle may be supported for tilting movement, to permit a person with a minimum effort to tilt the receptacle at a suitable inclination to effect a discharge of the contents thereof, and by reason of the fact that the receptacle is automatically locked in adjusted position, the receptacle may be easily tilted by one hand of the operator, while the other hand may be employed to hold the utensil that is to receive the contents discharged from the receptacle. It will be further noted by reason of this construction that the receptacle subsequent to being arranged upon the rack may be easily tilted without necessitating the handling of the same.

What is claimed is:—

1. A device of the class described comprising a base, standards rising therefrom, a barrel rack pivotally mounted between these standards, pivot studs projecting laterally from said rack and journaled in said standards, ratchet wheels fixed upon one of said studs, a stud projecting from one of said standards and positioned above said ratchet wheels, a spring pressed pawl for each of said ratchet wheels, and said pawls being mounted upon the stud carried by said standard.

2. In a device of the class described, a base, standards rising therefrom, a substantially diamond-shaped rack pivoted between said standards for tilting movement, two opposed extremities of the rack being formed to support a receptacle, the opposite sides of the rack being curved to embrace the sides of the receptacle, studs projecting centrally from said sides and journaled in openings in said standards, ratchet wheels fixed upon one of said studs, and a spring pressed pawl for each ratchet wheel, said pawls being supported upon one of said standards above the ratchet wheels and coöperating therewith to maintain the rack in any of its adjusted positions.

In testimony whereof I affix my signature in presence of two witnesses.

FELIX MAIER.

Witnesses:
A. H. KNEESE,
A. N. PETMECKY.

Copies of this patent may be obtained for five cents each, by addressing the "Commissioner of Patents, Washington, D. C."